J. J. FLEMING.
GARDEN TOOL.
APPLICATION FILED SEPT. 19, 1918.

1,302,348.

Patented Apr. 29, 1919.

Witness
H. Woodard

Inventor
J. J. Fleming
By H. B. Williamson &co.
Attorneys

UNITED STATES PATENT OFFICE.

JOSEPH JAMES FLEMING, OF BOONE, IOWA.

GARDEN-TOOL.

1,302,348.  Specification of Letters Patent.  Patented Apr. 29, 1919.

Application filed September 19, 1918.  Serial No. 254,832.

*To all whom it may concern:*

Be it known that I, JOSEPH J. FLEMING, a citizen of the United States, residing at Boone, in the county of Boone and State of Iowa, have invented certain new and useful Improvements in Garden-Tools; and I do declare the following to be a full, clear, and exact description of the invention, such as will enable others skilled in the art to which it appertains to make and use the same.

My invention has for its object to provide a novel form of tool capable of use with the handle and cross head disclosed in U. S. Patent 1246577, of November 13, 1917, the formation of the tool being such as to render it usable for numerous purposes, particularly for forming cavities in which to drop seed and for then covering the seed.

With the foregoing general object in view, the invention resides in the novel features of construction and unique arrangement of parts hereinafter fully described and claimed, reference being made to the accompanying drawing.

Figure 1:
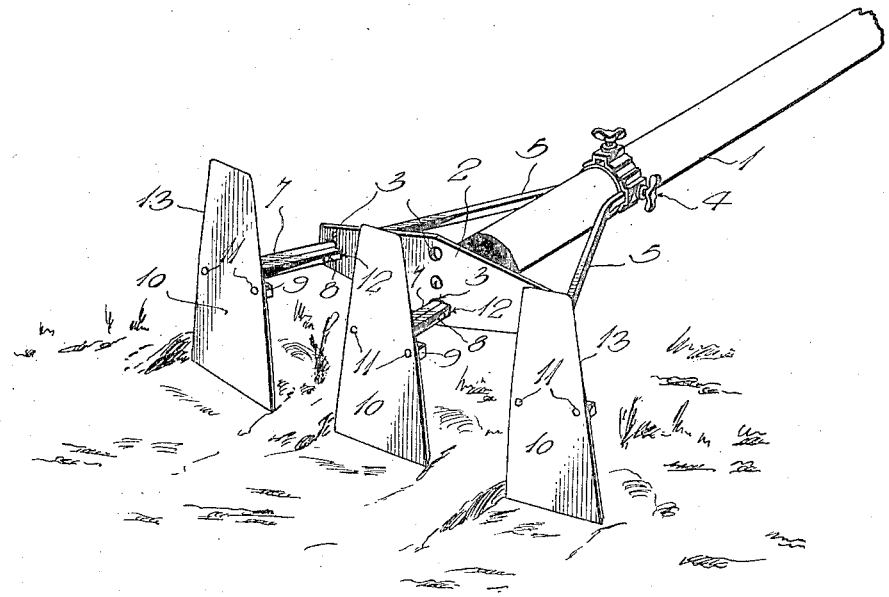
Figure 1 is a perspective view showing three of the tools attached to the handle.
Figure 2:
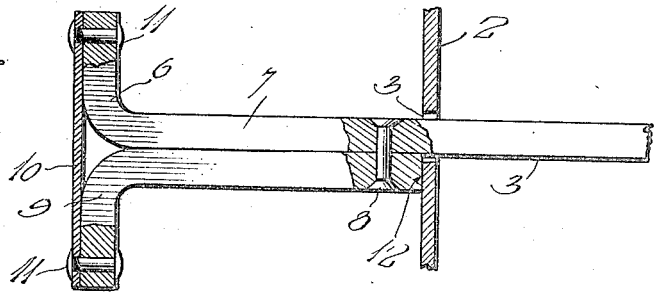
Fig. 2 is a horizontal section of one of the tool blades and parts of its carrying means, with other parts in elevation.
Figure 3:
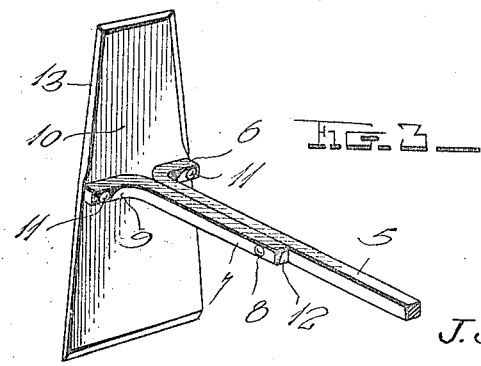
Fig. 3 is a perspective view of one of the tools detached from the handle.

In the drawing above briefly described, the numeral 1 designates a handle having a cross head 2 at its front end, said cross head having a plurality of openings 3 through which the tool shanks are adapted to pass, while the handle is provided with a clamp 4 for securing the shanks in place.

The tool shanks 5 are preferably though not necessarily formed of square metal stock, said shanks passing through the openings 3 and having their front ends bent laterally at 6. Relatively short metal bars 7 are riveted at 8 to the front end portions of the shanks 5 and have their front ends bent laterally at 9 in the opposite direction from the ends 6 and in alinement with the latter. The tool blades 10 are riveted at 11 to the laterally bent shank and bar ends 6 and 9 respectively and the rear ends of the bars 7 serve to abut the cross head 2, whereby to limit the insertion of the shanks into the openings 3, and at the same time to brace the cross head 2, it being obvious that such a bracing action will occur when the rear ends of the shanks 5 are anchored by the clamp 4 to the handle 1.

The blades 10 are preferably narrowed toward one end and the edge portions of said blades are provided with knife edges 13, it being intended that the narrow end of the blade shall be used to form cavities in which to plant the seed, while the other end of the blade will be employed for covering the seed. A plurality of the tools may be used together as shown in Fig. 1, only one of said tools may be employed, or any required number thereof may be used with other tools as occasion may require.

From the foregoing, taken in connection with the accompanying drawing, it will be seen that although my invention is of extremely simple and inexpensive nature, it will be highly efficient and in every way desirable. Since probably the best results are obtained from the details shown and described, they are preferably followed, but within the scope of the invention as claimed, numerous minor changes may well be made.

I claim:

1. A garden tool comprising a handle having a cross head on its front end provided with openings, tool shanks insertible rearwardly through said openings, means for clamping the rear ends of said shanks to the handle, the front ends of said shanks being bent laterally, relatively short metal bars riveted to one side of said shanks at the front portions of the latter, the front ends of said bars being bent laterally in the opposite direction from said bent shank ends and positioned in alinement therewith, and earth working blades riveted to said laterally bent shank and bar ends, the rear ends of said bars abutting said cross head to limit the insertion of the shank into the openings of said head and to brace said head.

2. A garden tool comprising a shank bent laterally at its front end, a relatively short bar riveted to the front portion of said shank and bent laterally at its front end in the opposite direction from said shank end, the bent ends of said shank and bar being alined, and an earth working blade riveted to said bent shank and bar ends.

In testimony whereof I have hereunto set my hand.

JOSEPH JAMES FLEMING.

Copies of this patent may be obtained for five cents each, by addressing the "Commissioner of Patents, Washington, D. C."